United States Patent [19]
Price

[11] 3,805,399
[45] Apr. 23, 1974

[54] WHEEL ALIGNMENT APPARATUS

[76] Inventor: Charles C. Price, 1401 First St., Alamos, Colo. 81101

[22] Filed: May 17, 1972

[21] Appl. No.: 254,070

[52] U.S. Cl. ............................. 33/336, 33/203.18
[51] Int. Cl. ........................................... G01b 19/28
[58] Field of Search......... 33/203.18, 203.2, 203.21, 33/336, 335, 337

[56] References Cited
UNITED STATES PATENTS
3,292,268  12/1966  Knight ................................. 33/336
2,627,123  2/1953   Taber................................... 33/336

*Primary Examiner*—William D. Martin, Jr.
*Attorney, Agent, or Firm*—Ancel W. Lewis, Jr.

[57] ABSTRACT

In wheel alignment apparatus there is provided a frame adapted to releasably mount against the outer face of a wheel having means to level the frame and a swing member pivotal about an upper pivot point and a pivot point at one lower end portion spaced from the frame leaving the other lower end portion free to swing. The free lower end portion has opposed caster and camber pointers movable along caster and camber scales arranged along the path of swing. A pair of uniquely configured, resiliently mounted, hook members yieldably but releasably mount the frame against the wheel. A pair of uniquely configured cross-rods with a distance scale at one end and sets of notches at the other end are supported on pivotal plates at the ends of frames on opposed wheels to measure toe-in and toe-out. Aligned line supports at opposite ends of the frame provide means for supporting a line extending from a frame mounted on the front and a frame mounted on the rear wheel to measure rear wheel track.

19 Claims, 19 Drawing Figures

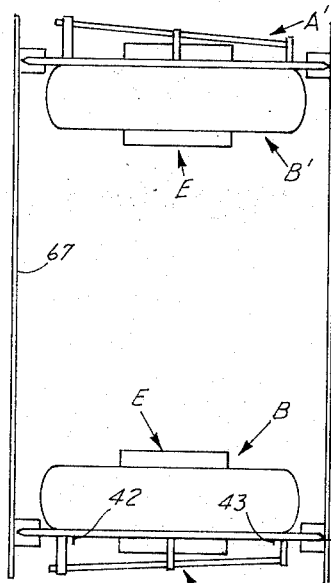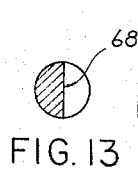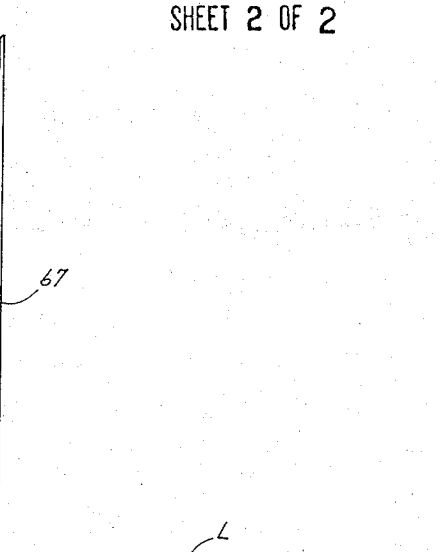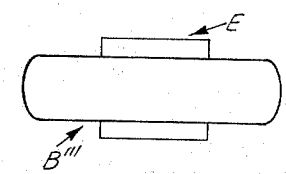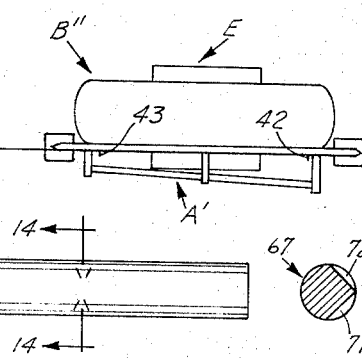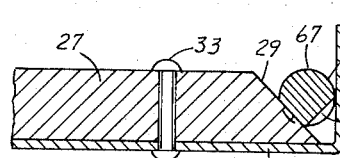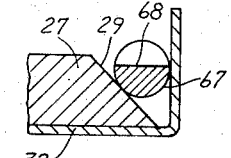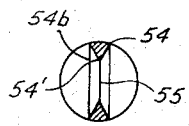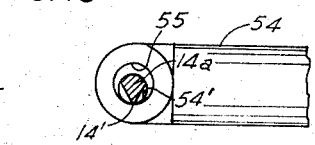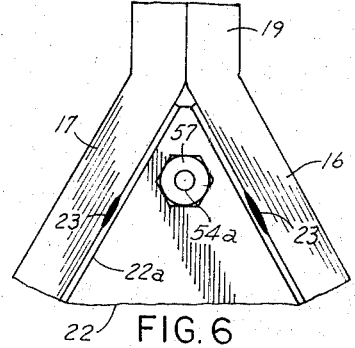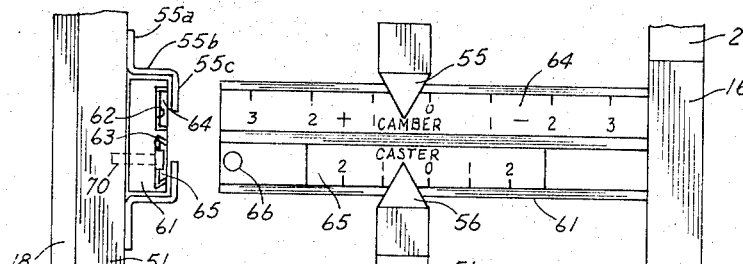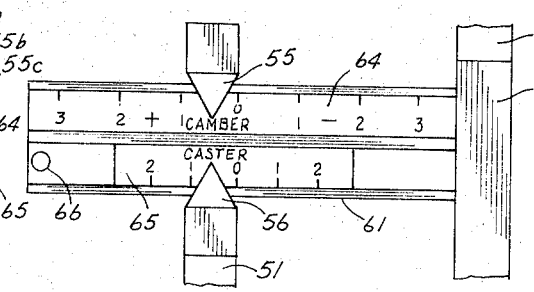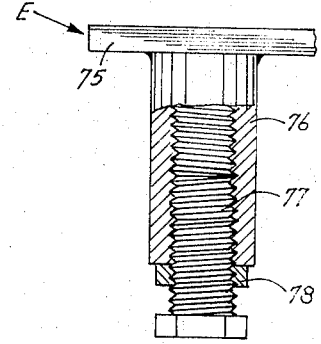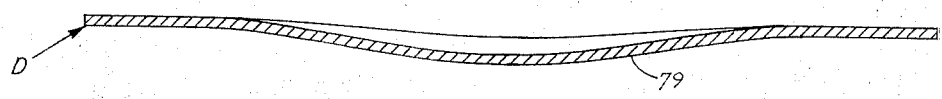

WHEEL ALIGNMENT APPARATUS

This invention relates to improvements in wheel alignment apparatus and more particularly to improved wheel alignment apparatus of the type which readily amounts on and demounts from each vehicle wheel while the wheels remain mounted on the vehicle.

Wheel alignment apparatus for keeping the interrelated parts of the front end of the vehicle including the wheels in proper adjustmnt have heretofore taken a variety of forms. The wheel alignment apparatus described in U.S. Pat. No. 3,292,268 provides an effective, relatively simple means for measuring toe-in, toe-out, caster, camber and the like. The present invention affords a number of advantages and features of improvements over known prior art as will be discussed in detail hereinafter.

Accordingly, it is an object of this invention to provide an improved apparatus for keeping the interrelated parts of the wheels properly adjusted and is suitable for use with both the front and rear wheels of a vehicle.

Yet another object of this invention is to provide a simplified, more direct, and faster measurement of caster and camber of vehicle wheels.

Still a further object of the present invention is to provide improved wheel alignment apparatus capable of adjusting for rear wheel track and capable of adjusting the level of the wheels relative to support surface.

Still a further object of the present invention is to provide improved cross-rod apparatus for measuring toe-in and toe-out.

Yet a further object of the present invention is to provide an improved wheel-mounted alignment gage for measuring caster and camber wherein the caster and camber scales are side by side and directly related to one another.

In accordance with the present invention in an improved form shown there is provided for each wheel a triangular shaped frame with an inner face yieldably and releasably held against an outer face of a wheel with the frame having leveling means, and a swing member supported in spaced relation to an outer face of the frame arranged to swing about an upper central pivot point and a lower pivot point at one lower end portion leaving the other lower end portion free to swing. The free lower end portion carries spaced, oppositely disposed caster and camber pointers which move along caster and camber scales, respectively, to indicate the amount of swing of the swing member to measure and the angle of deviation of the wheel from the vertical. The camber scale is stationary relative to the frame and the camber reading is made with the wheels straight ahead. The caster scale is movable relative to the movement of the swing member and the caster reading is made when the wheels are turned a preselected angle from the straight ahead position. A pair of hooks a particular shape and configuration are spring-mounted at one end on the frame to yieldable urge the frame against the wheel being tested. Improved cross-rod cooperates with support plates at the ends of a pair of the frames mounted on opposite wheels for measuring toe-in and toe-out. A pair of aligned supports on the frame provide means for attaching a line to frames on a front and rear wheel to measure rear wheel track. An adjustable platform under each wheel facilitates the leveling of the wheels relative to a support surface and a turn plate between the wheels and platform facilitate the turning of the front wheels with the full weight of the vehicle thereon.

Other objects, advantages and capabilities of the present invention will become more apparent as the description proceeds taken in conjunction with the accompany drawings in which:

FIG. 2 is a fragmentary top plan view of a rear portion of the gage assembly shown in FIG. 1 with the hook member in engagement with the tread of the tire;

FIG. 4 is a fragmentary sectional view showing the cross-sectional shape of the upper support arm for the swing member;

FIG. 5 is a fragmentary sectional view at right angles to FIG. 4 cutting through the upper bend portion of the swing member and showing the aperture in the upper support arm through which the bend portion exceeds in side elevation;

FIG. 6 is a fragmentary rear elevation view showing the upper portion of the frame and the attachment of the upper support arm to the upper gusset plate; and the attachment of the upper gusset plate to the frame members;

FIG. 7 is an enlarged side elevation view showing the forward scale support arm and associated caster and camber pointers and lower frame member;

FIG. 8 is an enlarged top plan view of the fragment shown in FIG. 7;

FIG. 12 is an enlarged top plan view of the cross-rod;

FIG. 13 is a cross-sectional view of the cross-rod taken along line 13—13 of FIG. 12;

FIG. 14 is a cross-sectional view of the cross-rod taken along lines 14—14 of FIG. 12;

FIG. 15 is a fragmentary sectional view through one support plate with the notched end portion of the cross-rod in place thereon;

FIG. 16 is a fragmentary sectional view through the support plate with the scale end portion of the cross-rod in place thereon;

FIG. 17 is a vertical sectional view through one leg of the adjustable platform;

FIG. 18 is a vertical sectional view through the center of the wheel turning plate;

FIG. 19 is a top plan diagrammatic view showing four wheels of a vehicle with the alignment apparatus being applied thereto.

Figure 1:
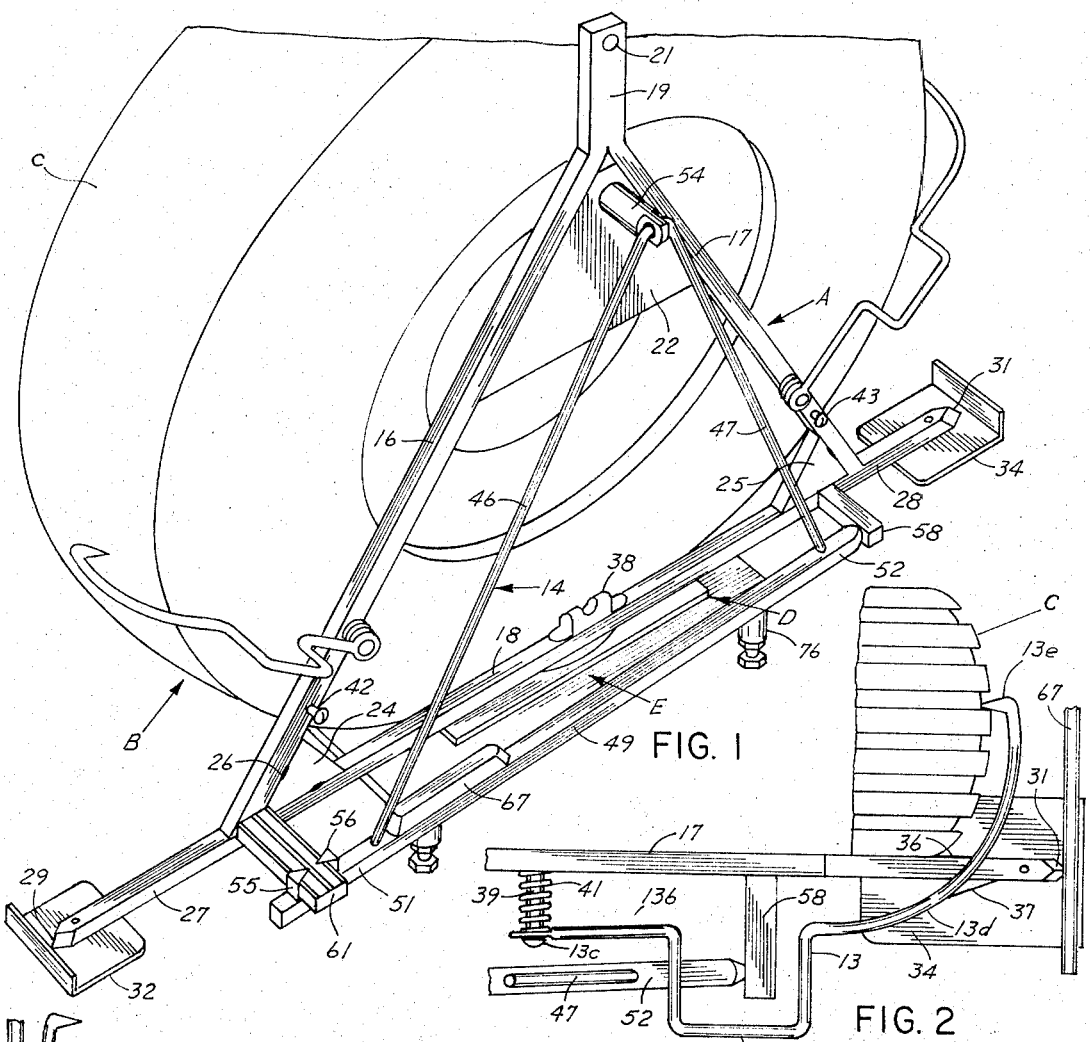
FIG. 1 is a perspective view of a wheel alignment gage assembly mounted on a wheel on the left side of a vehicle.
Figure 3:
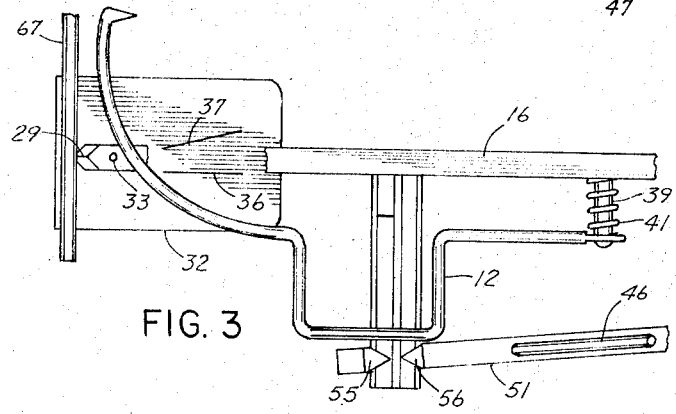
FIg. 3 is a fragmentary top plan view of a front portion of the gage assembly shown in FIG. 1 in a released position from the wheel.
Figure 9:
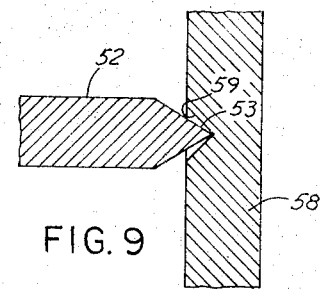
FIG. 9 is an enlarged cross-sectional view showing the structure which establishes the rear lower pivot point for the swing member.

In FIG. 1 there is shown a wheel alignment gage assembly A mounted on a left side vehicle wheel B having a pneumatic tire C, tire C being shown as supported on a turning plate D positioned on an adjustable platform E. As will be described more fully hereinafter with reference to FIG. 19, a pair of the gage assemblies are used in combination opposed wheels, one being made from the right side wheel and the other for the left side wheel to measure caster, camber toe-in, toe-out but a description of one gage assembly applies to both. The wheel-mounted alignment gage assembly A shown in FIG. 1 generally comprises a generally triangular shaped frame 11 having a pair of similar forward and rear fastening hook members 12 and 13 in an oppositely disposed relation to one another mounted on the frame for releasably fastening the frame in a yieldable engagement with the outer face of the tire C together with a generally triangularly shaped pendulum or swing member 14 being suspended from the frame 11 in spaced parallel relation thereto.

In describing the specific embodiment herein chosen for illustrating the invention, certain terminology relating to positions is used for convenience of explanation which will be recognized as being employed only for convenience and having no limiting significance. For example, the terms "upper" and "lower" and "forward" and "rear" refer to the illustrated embodiment in its normal position of use on the wheel shown in FIG. 1, taking the left front wheel as an example. The terms "inner" and "outer" will refer to the directions toward and away from the outer face or outer side wall of the wall of the wheel shown in FIG. 1.

The frame 11 comprises a pair of upright, forward and rear upper frame members 16 and 17, respectively, connected to form an upper inside angle and a horizontal lower frame member 18 connected to the lower ends of the upright frame members to form a pair of lower inside angles. The upper frame members 16, 17 and lower frame member 18 shown are made of a metal rod stock having a substantially square cross section arranged so that the faces thereof are in a common plane which bears against the outer side wall of the wheel and provides a reference plane for measuring the inclination of a wheel from the vertical. The upright frame members 16 and 17 are bent at the upper ends and extending upwardly beyond the upper inside angle to form an upper extension 19 having an aperture 21 to facilitate the hanging of the assembly on a wall or other suitable support when not in use. A triangular shaped metal gusset plate 22 with inturned flange edge portions 22a at the upright sides is secured to the upright frame members inside the upper angle preferable by welding shown in 23. The upper gusset plate 22 provides added frame strength and affords a display panel at its outer face for advertising and the like. A pair of triangular shaped forward and rear gusset plates 24 and 25 preferably made of solid metal are secured to the upright and lower rod members in the lower angles of the frame preferably by welding represented at 26 for added frame strength.

The frame 11 has a forward end section 27 and a rear end section 28 which are direct extensions or continuations of the lower frame member 18 beyond the lower ends of the upright frame members 16 and 17. The forward end section 27 terminates in a beveled end portion having a downwardly and forwardly inclined edge 29 providing a pointer for indicating toe-in and toe-out and in a like manner the rear end section 28 terminates in a beveled end portion having a downwardly and rearwardly inclined edge 31 providing a rear pointer for indicating toe-in and toe-out.

A forward cross-rod support plate 32 is pivotally mounted on the forward end section 27 with a pivot member 33 shown as a rivet and a rear cross-rod support plate 34 is similarly pivotally mounted on the rear end section 28. These cross-rod support plates 32 and 34 are similar in construction so that a description of one applies to both. As shown in FIG. 15 and 16, plate 32 has an upturned end portion 32a at the outer end spaced outwardly from the associated pointer edge 29 together with a bottom portion 32b under the end section 27. Each cross-rod support plate is shown as being provided with a camber line 36, extending longitudinally of the plate and disposed offset of the pivot so that the line 36 extends along the outer face of the associated frame end section when the upturned portion of the plate is disposed normal to the frame end section as best seen in FIg. 2. A caster line 37 is arranged on each support plate at a fixed acute angle of about 17.5° to the caster line 36. It is understood that it is necessary to have markings or lines 36 and 37 on the front cross rod support plate 32 and those on rear plate 34 may be eliminated. This elimination is readily apparent from an examination of FIG. 19 since the rods 67 and flanged support plates 32 form a parallelogram and pivotal movement of the front plate 32 on each side will necessarily move the rear plate 34 through the same angle so that no marking on the rear plate is required. A spirit level bubble 38 is mounted between the ends of the lower rod member of the frame for leveling the frame.

The fastening hook members 12 and 13 are identical in construction and each are comprised of a length of flexible rod of circular cross-section formed into a particular shape to provide for improved mounting stability for the frame and parts carried thereon. The rear hook member 13 shown in more detail in FIG. 2 has an intermediate U-shaped section 13a, a straight inner end section 13b extending from one end of one arm of section 13a and terminating in a flattened washer-like head section 13c provided with an aperture together with a hooked or arcuate outer end section 13d extending from the end of the other arm of section 13a which turns back at the end in a sharp pointed section 13e adapted to dig into a groove in the thread of the tire as shown in FIG. 2. An externally threaded, screw-type fastener 39 extends through the aperture in the fastener head 13a and threads into internal threads in a bore in the upright frame member. A compression spring 41 is held between the head section 13c and the frame member under compression and the spring 13 further compressed when the hook point extended into the tread in the tire gripping relation as shown in FIG. 2. This arrangement of the spring biased hook members yieldably urges the inner face of the frame against the outer face of the wheel and allows ready adjustment of the position of the frame on the wheel for leveling and the like.

A front screw 42 threads into an internally threaded hole in the outer face of the front frame member 16 between the gusset 24 and screw 39 and in a like manner and at the same elevation a rear screw 43 threads into an internally threaded hole in rod member 17 to provide means for fastening a line to the frame as a means to measure rear wheel track as described fully more hereinafter.

The swing member 14 is generally triangular shaped and is comprised of a pair of upright, upwardly convergent forward and rear upright rod portions 46 and 47 formed by a single length of metal rod of circular cross-section bent at an acute angle at its midpoint at 14a and a lower rod portion 47 connected to the lower ends of upright rod portions 46 and 47, the lower rod portion having a square transverse cross-section and the ends to the lower rod portion extending beyond the lower ends of the upright rod portions 46 and 47 to form a forward lower end section 51 and a rear lower end section 52. The rear end section 52 is tapered at the rear end and terminates in a sharp point 53. The forward rod extension 51 is provided with a forward camber pointer 55 and a rear caster pointer 56, the pointers 55 and 56 being in spaced apart, alignment, and opposed to one another. Each pointer is the constructed the same and as shown in FIGS. 7 and 8 comprises a lower portion 55a secured to the lower rod portion, an upstanding portion 55 b and an inturned portion 55c so that the pointers move over an associated scale described hereinafter.

The swing member or pendulum 14 is suspended from an upper support arm 54 which projects outwardly from the upper gusset plate. The upper support arm is in the form of metal rod with an externally treaded end portion 54a of reduced diameter inserted into an aperture the upper gussett plate 22 and has a nut 57 securing it to the gusset plate. The upper support arm 54 has flat-sided outer end portion 54b adapted to receive the bend portion 14a joining rod portions 46 and 47 of the swing member. The diameter of the aperture 55 is substantially larger than the cross section of the bend portion 14a so that the swing member swings freely therein and defines an upper pivot point for the swing member. The cross-section of the bend portion 14a has a double taper or bevel on each side to form a knife-like edge 14' which is transverse to and rests on the beveled edge 54' of the support arm to reduce the drag or friction thereon and thereby swing freely.

A rear lateral support arm 58 is secured at one end to the lower frame member 18 and is provided with a socket 59 in the forward face thereof aligned with the aperture 55 in the support arm a fixed distance from the outer face of the frame. The angle of the taper of socket 59 is substantially greater than that of the taper of the rear end section 52 to allow the swing member to pivot freely relative thereto. A forward scale support arm 61 is secured at the forward lower end of the forward frame member 16 and is arranged parallel to rear arm 58. The forward scale support arm 61 has a pair of relatively shallow forward and rear grooves 62 and 63, respectively formed in the top surface thereof arranged parallel to one another. Groove 62 receives a camber scale plate 64 having principal transverse distance lines at nine-sixteenths inch intervals with the middle line designated with indicia 0, and indicia −1, −2 and −3 is arranged at distance lined from 0 toward the frame and indicia +1, +2 and +3 at distance lines from 0 away from the frame. The camber scale plate 64 is fixed or stationary in the groove and extends substantially the full extent of the forward support arm 61. Groove 63 has undercut side edges and slidably receives a caster scale plate 65 from the outer end. Caster scale plate has principal transverse distance lines in one-fourth inch intervals with the middle line designated with indicia 0. Indicia 1 and 2 are applied to distance lines on each side of indicia 0. The caster scale is shorter in length than groove 63 and is slidable in the groove relative to the support arm in groove 63. A screw 70 is threaded into the upper end of the upper support arm and projects beyond the bottom of the arm to prevent the caster scale plates from coming out of the end of the groove 63 once it is in place and provide a stop which prevents the member 14 from swinging beyond the end of the front support arm. As best seen in FIG. 7 the top surface of the scale support arm 61 and the sides of arm 61 are spaced inwardly from the upright sides of the pointers 55 and 56 so that the swing member may swing freely relative to the forward support arm. The swing member does not drag along the bottom since the lower surface thereof is above the bottom surface of frame member 18. A weight 66 is mounted on the lower rod portion 48 forwardly of its midpoint and serves to increase the swinging motion and to urge the rear pointed end 53 into the tapered socket hole 59.

Figure 10:
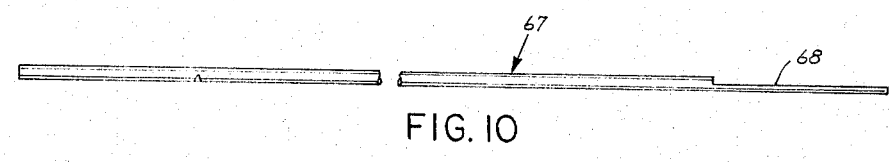
FIG. 10 is a side elevation view of a cross-rod.
Figure 11:
FIG. 11 is a top plan view of a cross-rod.

Referring now to FIGS. 10 and 11, a cross-rod 67 is provided which is used in pairs and cooperate with the cross-rod support plates 32 and 34 to measure toe-in and toe-out. Each cross-rod 67 is shown in more detail in FIGS. 12–14 has a generally circular transverse cross section and has a flat section 68 at one end on which a distance scale with one eighth inch line increments are provided. As best seen in FIG. 14 the rod has a plurality of pairs of opposed notches 71 and 72 arranged at space intervals in the rod opposite the scale end. The pairs of notches are arranged to extend inwardly on an angle toward one another and to fit between the upstanding flange portion on the support plate and the inclined pointer edge of the associated frame end portion as shown in FIG. 15. At the other end of the cross-rod, the flat scaled surface 68 faces up and the rounded section faces down and rests on edge 29 and against the inside of the upstanding flange portion. The plurality of pairs of notches 71 and 72 at fixed distances along the rod facilitates the measuring of different vehicle widths and facilitates different thread widths.

Referring now to FIG. 17, the adjustable platform E comprises a flat rectangular metal plate 75 having handles (not shown) at each end to facilitate lifting thereof. The plate 75 is supported on four adjustable legs comprising tubular sockets 76 with internal threads secured to the undersurface of the plate at each corner, preferably by welding, A bolt 77 is threaded in each leg socket to a selected position height and the head of the bolt forms a support engaging foot and a lock nut 78 is threaded on a bolt 77 which locks the bolt against rotation at a selected position. In use, the adjustable platform legs are adjusted to provide a level surface for each wheel. The dished plate D is a generally rectangular body formed with a concave central portion 79 having curvature which approximates that of a tire and in use the dished plate D rests on the platform plate 75 allows the front wheels to be turned relative to the platform plate with the full weight of the car resting thereon.

The use of the above described apparatus will now be explained for measuring the various alignment characteristics of the front and rear wheels, including caster, camber rear wheel track and toe-in and toe-out. In use, the particular vehicle being measured is checked against manufacturer's recommendations for height above the road of the various vehicle body parts. Referring now to FIG. 19 the vehicle being measured is represented by front wheels B, B' and rear wheels B" and B'". Before aligning begins, the adjustable platforms E are located on the floor to correct for level deficiences and elevate the vehicle. The vehicle is inspected for damage, worn parts and wheel run out. The dished plates D are placed on each of the two front platforms in substantially centered position thereon. A left side wheel alignment gage assembly A is placed on the left front wheel B and a right side wheel alignment gage assembly A' is placed on the right front wheel B'. The gage assemblies are mounted on the associated tire by placing the point of the fastening hook members into the tread and the associated frame is then more closely positioned by noting the position of the spirit level 38. The frame 14 is leveled by tilting it forwardly or rearwardly until the bubble indicates a level position.

TOE-IN AND TOE-OUT

For the measurement of the toe-in and toe-out a cross-rod 67 is placed in the front support plates of the pair of assemblies A and A' and a rear cross rod 67 as placed in the rear support plates of assemblies A and A' with a pair of notches in the beveled, inclined edge and the rounded section in the other as above described. If the indicating pointer relative to the scale on the forward cross-rod is greater than that indicated on the rear cross-rod, the wheels toe out and if the reverse is true the wheels toe in. The difference between the scale readings is the amount of toe-in or toe-out present which can then be adjusted.

CAMBER AND CASTER

To find camber, the front wheels B and B' are disposed in their straight ahead position with line 36 being straight along the side frame extension 27. The camber is indicated by the position of a forward front pointer 55 over the fixed camber scale 64. To find caster, with the wheel still in the camber reading position, the movable caster scale plate is moved in relation to its support so that the zero (0) on the scale is directly beneath the rear pointer 56. The front wheels are then turned to move the plate to the caster line 37 on the support plate until it lines up with the outer face of the frame 16 and the amount of caster is read on scale 65 indicated by pointer 56 The same procedure is repeated at the other front wheel B'.

BODY LEVEL

To measure body level a body level gage is applied at points recommend by the vehicle manufacturer usually at the center of the fender and the right and left front and rear. Heights must be comparable within tolerance or aligning is not possible.

REAR WHEEL TRACK

After the front wheel has been squared by the toe-in and toe-out measurements above described the right front gage assembly A' is removed and installed on the rear wheel B'' on the same side, (left side in FIG. 19), the rear wheel also having been squared by the above toe-in and toe-out measurements. A line or string is attached to the front screw 42 and is passed along the rear screw 43 of the front frame on the left front wheel B and along the front screw 43 continuing rearwardly to the rear screw 42 of the gage assembly A' on the left side of the vehicle as shown in FIg. 19. If all of the members are touched by the line, the left rear wheel is square and the rear wheel is in track. Deviation is determined by loosening either end and extending the line outwardly until the line clears the outer face of the associated frame member. Identical opposite prodecures are used for the right side of the vehicle.

Although the present invention has been described with a certain degree of particularity, it is understood that the present disclosure has been made by way of example and that changes in details of structure may be made without departing from the spirit thereof.

What is claimed is:

1. In apparatus for measuring the alignment of the wheels of a vehicle, the combination comprising:
a frame having an inner face,
fastening means for releasably securing the inner face of the frame against an outer face of a wheel,
a swing member supported in spaced relation to the frame at an upper pivot point and a lower pivot point so that a free swinging lower end portion of the swing member opposite the lower pivot point swing about said upper and lower pivot points, said lower end portion of the swing member having a camber pointer and a caster pointer movable along and relative to a camber scale and a caster scale, respectively, said camber and caster pointers being in alinement with one another, said scales being arranged side by side and along the path of movement of the swing member, said camber scale being fixed and said caster scale being movable in a parallel relation to the camber scale, the camber of the wheel being indicated by the position of the camber pointer relative to the camber scale when the wheel is in the straight ahead position and the caster being indicated by the position of the caster pointer relative to the caster scale when the wheel is turned through a preselected angle from the straight ahead position.

2. In apparatus as set forth in claim 1 wherein said frame is generally triangular in shape with a pair of opposed upright frame members and a lower frame member, connected to form upper and lower inside angles, said upright members being in the form of rods having generally square cross-section and a gusset plate welded in each angle of the frame.

3. In apparatus as set forth in claim 2 further including leveling means for the frame in the form of a bubble-type spirit level mounted on said lower frame member.

4. In apparatus as set forth in claim 1 wherein said fastening means includes a pair of fastening hook members supported at opposite sides of the frame, each said hook member having an intermediate U-shaped section, a straight inner end section terminating in a flattened head, and a hooked outer section terminating in an inturned point adapted to engage a tire tread on the wheel, and a spring held between said flattened head and normal to the head and frame and frame under compression to apply a tension on fastening member hook to yieldingly urge the frame against an outer face of the wheel.

5. In apparatus as set forth in claim 1 including an upper support arm projecting outwardly from the frame having an aperture through which an upper portion of the swing member extends to establish said upper pivot point.

6. In apparatus as set forth in claim 1 including a lower support arm on the frame extending transverse thereto, said lower support arm having a tapered socket adapted to receive a tapered end portion of the swing member to establish said lower pivot point.

7. In apparatus as set forth in claim 1 including a lower support arm on the frame projecting outwardly therefrom for supporting said camber and caster scales.

8. In apparatus as set forth in claim 7 wherein said lower support arm has a pair of grooves arranged side by side adapted to receive a caster scale plate and a camber scale plate defining said caster and camber scales respectively, the groove for said caster plate being undercut along the sides to allow for slidable movement of the caster plate therein.

9. In apparatus as set forth in claim 1 wherein said camber and caster pointers are spaced apart, and are oppositely disposed.

10. In apparatus as set forth in claim 1 wherein said frame has an extension at each lower end terminating in a pointer, a support plate pivotally mounted on each extension and extending beyond the associated pointer, each said front support plate having line means to indicate a camber position for the wheel and the caster position for the wheel.

11. In apparatus as set forth in claim 1 wherein said swing member has a weight at the free swinging lower end portion.

12. In apparatus as set forth in claim 1 wherein said swing member is generally triangular shaped and is made of a rod section bent at its midpoint to form a pair of upright rod portions joined by an intermediate angle portion and a lower rod portion connecting the upright rod portions.

13. In apparatus as set forth in claim 12 wherein said intermediate angle portion has a first knife-like edge, and an upper support arm supported by the frame having an aperture defined by a beveled edge disposed at right angles to the first knife-like edge to support said swing member.

14. In apparatus as set froth in claim 1 further including a pair of supports on opposite sides of the frame for supporting a line for measuring the wheel track.

15. In apparatus for measuring the alignment of the wheels of a vehicle, the combination comprising:
a generally triangular frame having an inner face providing a reference plane for measuring the inclination of a wheel from the vertical,
fastening means for yieldably urging the inner face of the frame against an outer face of a wheel,
means for leveling the frame while mounted on the wheel,
a generally triangular shaped swing member,
an upper support arm projecting outwardly from the frame supporting the swing member in spaced relation to the frame at an upper pivot point,
a lower support arm projecting outwardly from the frame supporting the swing member at lower pivot point so that a free swinging lower end portion of the swing member opposite the lower pivot point swings about said upper and lower pivot points, said lower end portion of the swing member having a camber pointer and a caster pointer in spaced apart alignment with one another at opposite sides of the lower end portion and movable along and in a parallel relation relative to a camber scale and a caster scale, respectively, said caster and camber scales being arranged side by side and transverse to the inner face of the frame, said camber scale being fixed and said caster scale being movable, the camber of the wheel being indicated by the position of the camber pointer relative to the camber scale when the wheel is in the straight ahead position and the caster being indicated by the position of the caster pointer relative to the caster scale when the wheel is turned through a preselected angle from the straight ahead position.

16. In apparatus for measuring the alignment of the wheels of a vehicle, the combination comprising:
an alignment gage assembly mounted on each of a pair of oppositely disposed wheels on a vehicle, each said gage assembly including a frame having an inner face,
fastening means for releasably securing the inner face of the frame against an outer face of a wheel,
a swing member supported in spaced relation to the frame at an upper pivot point and a lower pivot point so that a free swinging lower end portion of the swing member opposite the lower pivot point swings about said upper and lower pivot points, said lower end portion of the swing member having a camber pointer and a caster pointer in alignment with the camber pointer and movable along and relative to a camber scale and a caster scale, respectively, said scales being arranged side by side and along the path of movement of the swing member, said camber scale being fixed and said caster scale being movable in a parallel relation to the camber scale, the camber of the wheel being indicated by the position of the camber pointer relative to the camber scale when the wheel is in the straight ahead position and the caster being indicated by the position of the caster pointer relative to the caster scale when the wheel is turned through a preselected angle from the straight ahead position,
a cross-rod support plate mounted on an end extension at the lower end of each frame, each front support plate having means to indicate when the wheels are straight ahead to measure camber in one wheel position and means to indicate the wheels are turned through a preselected angle from the straight ahead position and to measure caster,
a front cross-rod disposed on the support plates in front of the pair of wheels and a rear cross-rod supported on opposed support plates at the rear of the pair of wheels.

17. In apparatus as set forth in claim 16 wherein each said cross-rod is in the form of an elongated rod member of substantially circular cross-section, said rod member having a flattened side at one end with scale distance marking and having a plurality of sets of notches at spaced intervals at the opposite end.

18. In apparatus for measuring the alignment of the front and rear wheels of a vehicle, the combination comprising:
an adjustable platform under each front wheel for leveling the vehicle, each said platform including a support plate, a stationary leg section secured at each corner of the underside of the plate and a movable leg section in each stationary leg section to adjust the height of each corner of the support plate,
a turning plate on the platform under the front wheels to faciltate the turning of the front wheels relative to the platform, each said turning plate including a concave portion having approximately the same radius of curvature as the wheel, and an alignment gage assembly mounted on at least two of said wheels, each said gage assembly including a frame having an inner face, fastening means for releasably securing the inner face of the frame against an outer face of a wheel, a swing member supported in spaced relation to the frame at an upper pivot point and a lower pivot point so that a free swinging lower end portion of the swing member opposite the lower pivot point swings about said upper and lower pivot points, said lower end portion of the swing member having a camber pointer and a caster pointer in alignment with the camber pointer and movable along and relative to a camber scale and a caster scale, respectively, said scales being arranged side by side and along the path of movement of the swing member, said camber scale being fixed and said caster scale being movable in a parallel relation to the camber scale, the camber of the wheel being indicated by the position of the camber pointer relative to the camber scale when the wheel is in the straight ahead position and the caster being indicated by the position of the caster pointer relative to the caster scale when the wheel is turned through a preselected angle from the straight ahead position.

19. In apparatus as set forth in claim 18 wherein said alignment gage assemblies are mounted on the front and rear wheels of the same side of the vehicle, each frame having a pair of alignment support members on the frame and line means extending along the support members of the front and rear frames to measure rear wheel track.

* * * * *